United States Patent [19]

Kent et al.

[11] Patent Number: 5,338,784
[45] Date of Patent: Aug. 16, 1994

[54] ARTICLE OF MANUFACTURE AND COMPOSITION FOR MAINTAINING THE INTEGRITY OF HOSIERY

[75] Inventors: Carole L. Kent, 8 Hitching Post La., Chappaqua, N.Y. 10514; Dieter Frank, Naperville, Ill.

[73] Assignee: Carole L. Kent, Chicago, Ill.

[21] Appl. No.: 950,427

[22] Filed: Sep. 23, 1992

Related U.S. Application Data

[62] Division of Ser. No. 716,904, Jun. 18, 1991, Pat. No. 5,151,302.

[51] Int. Cl.$^5$ .................. C08L 1/00; A61K 7/04
[52] U.S. Cl. .................. 524/31; 524/32; 524/33; 524/297; 424/61; 427/207.1; 427/389.9; 401/209
[58] Field of Search .......... 523/105; 524/297, 31, 524/32, 33; 424/61; 401/209; 428/479.3, 508; 427/207.1, 389.9

[56] References Cited

U.S. PATENT DOCUMENTS

| | | | |
|---|---|---|---|
| 3,195,168 | 7/1965 | Roberts | 401/209 |
| 3,767,443 | 10/1973 | Clark et al. | 106/291 |
| 4,068,322 | 1/1978 | Rathel | 2/239 |
| 4,126,675 | 11/1978 | Boulogne et al. | 526/330 |
| 4,301,046 | 11/1981 | Schlossman | 523/105 |
| 4,425,326 | 1/1984 | Guillon et al. | 424/61 |
| 4,526,913 | 7/1985 | Winkler et al. | 524/31 |
| 4,545,981 | 10/1985 | Jacquet et al. | 424/61 |
| 4,595,585 | 1/1986 | Papantoniou et al. | 424/47 |
| 4,954,619 | 9/1990 | Lang et al. | 536/20 |
| 4,993,860 | 2/1991 | Sommer | 401/209 |
| 4,994,127 | 2/1991 | Sallenbach | 156/64 |
| 5,051,017 | 9/1991 | Yorks | 401/209 |

FOREIGN PATENT DOCUMENTS 2082124  3/1982  United Kingdom ............ 401/209

*Primary Examiner*—Paul R. Michl
*Assistant Examiner*—LaVonda DeWitt
*Attorney, Agent, or Firm*—Curtis, Morris & Safford

[57] ABSTRACT

A article of manufacture and composition for preventing a tear, hole or run in hosiery from expanding, wherein the composition comprises:
(a) nitrocellulose,
(b) resin,
(c) dioctylphthalate, and
(d) a solvent or solvent mixture.

7 Claims, No Drawings

ARTICLE OF MANUFACTURE AND COMPOSITION FOR MAINTAINING THE INTEGRITY OF HOSIERY

This application is a division of application Ser. No. 07/716,904, filed Jun. 18, 1991, now U.S. Pat. No. 5,151,302.

FIELD OF THE INVENTION

This invention relates to a method and composition for maintaining the integrity of hosiery. More specifically, the invention relates to a method and composition which can be applied to hosiery to stop tears, holes and runs, and to prevent tears, holes and runs from expanding, in hosiery.

BACKGROUND OF The INVENTION

Tears, holes and runs in hosiery have been a problem ever since hosiery has been worn. The lack of any method to prevent a tear, hole or run, and particularly to prevent a tear, hole or run from expanding once it has started, has become an increasingly difficult problem for many hosiery wearers.

Tears, holes and runs in hosiery, as any wearer knows, are started in a number of ways. For example, a tear, hole or run can be started, and even go unnoticed for some time, when the hosiery is put on by the wearer. A sharp toenail, or a sharp fingernail, can tear or put a hole in the hosiery. As the hosiery is worn, the tear can expand and become an unsightly run. Similarly, while being worn, a run can be started from a sharp fingernail, by being caught on another sharp object, or simply from ordinary wear and tear.

It is recognized that one way to prevent a run in hosiery is to apply a sealant to a tear, hole or run already present in the hosiery. This is typically achieved by applying nail polish to the tear, hole or run. However, while nail polish has been used, it has not proven to be very satisfactory for the purpose. For example, nail polish drips from its applicator brush when it is applied; during application, a free hand may not be available to hold back other clothing and keep it from contacting the nail polish that has already been applied; nail polish adheres to the skin; nail polish does not dry quickly; and when nail polish does dry, it is brittle.

OBJECTS OF THE INVENTION

Accordingly, it is an object of the present invention to provide a satisfactory sealant composition for a tear, hole or run in hosiery.

It is another object of the invention to provide a satisfactory sealant composition for preventing a tear, hole or run from expanding in hosiery.

It is still another object of the invention to provide a satisfactory sealant composition for preventing a tear, hole or run from expanding in hosiery, said composition being easy to apply, malleable, washable, quick drying and adherent to the hosiery but not to the skin.

It is yet another object of the invention to provide a method for preventing a tear, hole or run from expanding in hosiery.

These and other objects are achieved by the present invention as will be readily apparent from the following description and claims.

SUMMARY OF THE INVENTION

In one aspect, the invention is in a composition for preventing a tear, hole or run in hosiery from expanding comprising nitrocellulose, resin, dioctylphthalate and a solvent or solvent mixture.

In another aspect, the invention is in a method for preventing a tear, hole or run in hosiery from expanding, comprising the step of applying a composition to said tear, hole or run in an amount effective to prevent the tear, hole or run from expanding, said composition comprising nitrocellulose, resin, dioctylphthalate and a solvent or solvent mixture.

In still another aspect, the invention is in a method for preventing a tear, hole or run in hosiery from expanding, comprising the step of applying by roll-on a composition to said tear, hole or run, in an amount to cover completely said tear, hole or run, said composition comprising 15 grams nitrocellulose, 10 grams p-toluenesulfonamide-formaldehyde resin, 3 grams dioctylphthalate, 33 grams acetone and 11 grams ethanol.

DESCRIPTION OF CERTAIN PREFERRED EMBODIMENTS

An effective, strong, inexpensive, adherent composition for preventing runs in hosiery from expanding has now been discovered. It can be applied in any form, can completely cover a tear, hole, or run in hosiery, and is effective to prevent further damage to the hosiery.

The composition of the invention comprises broadly:
(a) nitrocellulose,
(b) a resin,
(c) dioctylphthalate, and
(d) a solvent or mixture of solvents.

Desirably, the composition can also contain a suitable amount of a coloring agent to match the color of the hosiery to which it is to be applied.

Nitrocellulose has been used extensively as a constituent of lacquers- Desirably, the composition of the present invention comprises from about 15 to 21% by weight of nitrocellulose, and preferably from about 18 to 21% by weight.

The composition also contains a resin. The preferred resin is of the santolite-type, and particularly, p-toluenesulfonamide-formaldehyde resin. Desirably, the composition comprises from about 10 to 14% by weight of the resin, and preferably from about 12 to 14% by weight.

The dioctylphthalate is preferably present in an amount from about 3 to 4% by weight, and preferably about 4% by weight.

The composition also includes a solvent or mixture of solvents. In particular, a solvent is used to dissolve the nitrocellulose and resin. It is particularly useful to use lower boiling solvents so that the composition dries quickly. Long drying times are inconvenient. (Nail polish generally includes higher boiling solvents and therefore requires a longer drying time.) A preferred solvent is acetone. In a particularly preferred embodiment, a mixture of acetone and ethanol are used. While any effective amount of solvent will suffice, typically the composition comprises from about 61 to 72% by weight solvent, and preferably from about 61 to 67% by weight. When a mixture of acetone and ethanol are used, the composition comprises from about 46 to 58% by weight acetone and 13 to 15% by weight ethanol, and, preferably, from about 46 to 54% by weight acetone and 13 to 15% by weight ethanol.

The composition has the capacity to prevent a tear, hole or run in hosiery from completely ruining the hosiery. The composition, unlike conventional fingernail polish, is malleable, washable, quick drying, and adherent to the hosiery but generally not to the skin.

The composition may be stored in any convenient form, for example, a jar, a jar with a brush, a roll-on bottle, any type of bottle, etc. Similarly, the composition can be applied in any convenient form, for example by spraying, brushing, roll-on, etc. In the preferred embodiment, the composition is stored in a bottle having a rollerball top; and the composition is applied to the tear, hole or run in hosiery simply by inverting the bottle to wet the roller ball and then rolling the roller ball across the tear, hole or run to apply the composition in an amount to cover completely the tear, hole or run.

The composition is prepared by dissolving the nitrocellulose in the solvent or solvent mixture. The resin and dioctylphthalate are simply added and thoroughly mixed. Thereafter, if desired, coloring agents and any optional auxiliary ingredients are added and mixed.

With respect to coloring agents, generally any coloring agent can be used. It is well within the skill of the art to chose an appropriate agent and include it in the formulation. For example, titanium dioxide can advantageously be included for white formulations. Certain pigments are known to settle out of formulations but can be redispersed with vigorous shaking. If such pigments are to be used, they are preferably dispersed in the formulation by means of two-roll mill grinding.

For the best results, the percent solids of the formulation should be between about 25 and 35%, preferably between about 27 and 34%, or, in terms of viscosities, between about 85 and 350 cStokes, preferably between about 150 and 315 cStokes.

The compositions of the invention are further described in the following examples.

| Component | EXAMPLES: | | |
|---|---|---|---|
| | 1 | 2 | 3 |
| | Amount in Grams | | |
| nitrocellulose | 15 | 15 | 15 |
| p-toluenesulfonamide-formaldehyde resin | 10 | 10 | 10 |
| dioctylphthalate | 3 | 3 | 3 |
| acetone | 58 | 44.6 | 33 |
| ethanol | 14 | 10.7 | 11 |
| Percent Solids | 25 | 30 | 34 |
| Viscosity in cStokes | 87.4 | 206.3 | 310 |

The terms and expressions which have been employed are used as terms of description and not of limitation, and there is no intention in the use of such terms or expressions of excluding any equivalents of the features shown and described or portions thereof, it being recognized that various modifications are possible within the scope of the invention.

We claim:

1. An article of manufacture useful for preventing a tear, hole or run in hosiery from expanding comprising the combination of a roll-on bottle and the composition of nitrocellulose, resin, dioctylphthalate, and a solvent or solvent mixture contained in the bottle, said composition being in suitable form for application from said bottle to said tear, hole or run in roll-on form.

2. A article as recited in claim 1, wherein said composition contains, in addition, an effective amount of a coloring agent.

3. A article as recited in claim 1, wherein said resin is p-toluenesulfonamide-formaldehyde resin.

4. A article as recited in claim 1, wherein said solvent mixture is a combination of acetone and ethanol.

5. An article of manufacture useful for preventing a tear, hole or run in hosiery from expanding, comprising the combination of a roll-on bottle and a composition contained in the bottle, the composition consisting essentially of from about 15 to 21% by weight nitrocellulose, from about 10 to 14% by weight p-toluenesulfonamide-formaldehyde resin, from about 3 to 4% by weight dioctylphthalate, from about 46 to 58% by weight acetone and from about 13 to 15% by weight ethanol, and optionally an effective amount of a coloring agent.

6. A article as recited in claim 5, comprising from about 18 to 21% by weight nitrocellulose, from about 12 to 14% by weight p-toluenesulfonamide-formaldehyde resin, about 4% by weight dioctylphthalate, from about 46 to 54% by weight acetone and from about 13 to 15% by weight ethanol.

7. A article as recited in claim 6, comprising 15 grams nitrocellulose, 10 grams p-toluenesulfonamide-formaldehyde resin, 3 grams dioctylphthalate, 33 grams acetone and 11 grams ethanol.

* * * * *